March 12, 1929.  B. E. G. MITTELL  1,704,802
CONTROL FOR WIRELESS RECEIVING SETS
Filed May 2, 1925   3 Sheets-Sheet 1

Inventor:-
Brenchley Ernest George Mittell
By Mauro Cameron Lewis & Kerkam
Attorneys March 12, 1929.  B. E. G. MITTELL  1,704,802
CONTROL FOR WIRELESS RECEIVING SETS
Filed May 2, 1925   3 Sheets-Sheet 3

Patented Mar. 12, 1929.

1,704,802

UNITED STATES PATENT OFFICE.

BRENCHLEY ERNEST GEORGE MITTELL, OF IVER, ENGLAND, ASSIGNOR TO VICTOR TALKING MACHINE COMPANY, OF CAMDEN, NEW JERSEY, A CORPORATION OF NEW JERSEY.

CONTROL FOR WIRELESS RECEIVING SETS.

Application filed May 2, 1925, Serial No. 27,614, and in Great Britain May 5, 1924.

This invention relates to an improvement in or modification of the controls for wireless receiving sets and other electrical apparatus described in my application for Patent Serial No. 749,789, dated November 13th, 1924.

In the specification of that application is described an apparatus whereby all the variables, in a wireless receiving set or other electrical apparatus, such as condensers, inductances, couplings and the like may be adjusted by turning a single knob.

The object of the present invention is to provide means whereby an apparatus embodying this control may be converted or adjusted to suit different working conditions. For example, in the case of a wireless receiving set it is desirable to be able to alter the reaction coupling according to whether the transmitting station is near or far away and this alteration may be effected by the means forming the subject of the present invention.

In the control apparatus described by way of example in the earlier application a cam is mounted so as to be rotated synchronously with the variable condenser, so that it can vary the coupling of the reaction coils correspondingly and so keep the reaction constant or approximately so, to whatever wave length the set may be tuned by varying the condenser.

In order to be able to vary the reaction coupling in different ways according to the distance from the transmitting station, raised or steepened portions may be provided on the cam which controls the reaction coupling, so that the extent or rate of movement of the reaction coil, relatively to the aerial inductance coil, during the operation of the control is altered. The arrangement is of course equally applicable for the adjustment of other variables such as inductances, condensers and the like.

It will be understood that just as in the apparatus described in the earlier application it is proposed to tune the aerial once and for all according to the location of the receiving set, so also the cam or cams which controls or control the reaction coupling will be shaped once and for all by means of the raised or steepened portions to suit certain circumstances and for receiving from certain stations.

The present invention accordingly consists in an improvement in or modification of the controls for wireless receiving sets and other electrical apparatus described in the earlier application above referred to wherein one or any number of the cams, rotated through the medium of the control member to vary the electrical values of the variable components of the apparatus, is or are furnished with one or more raised or steepened portions on its periphery, or their peripheries, so that the degree of variation of the electrical value of the components, corresponding to said cams, for a given movement of the control member is changed.

The invention is illustrated in the accompanying drawings in which—

Figure 1:
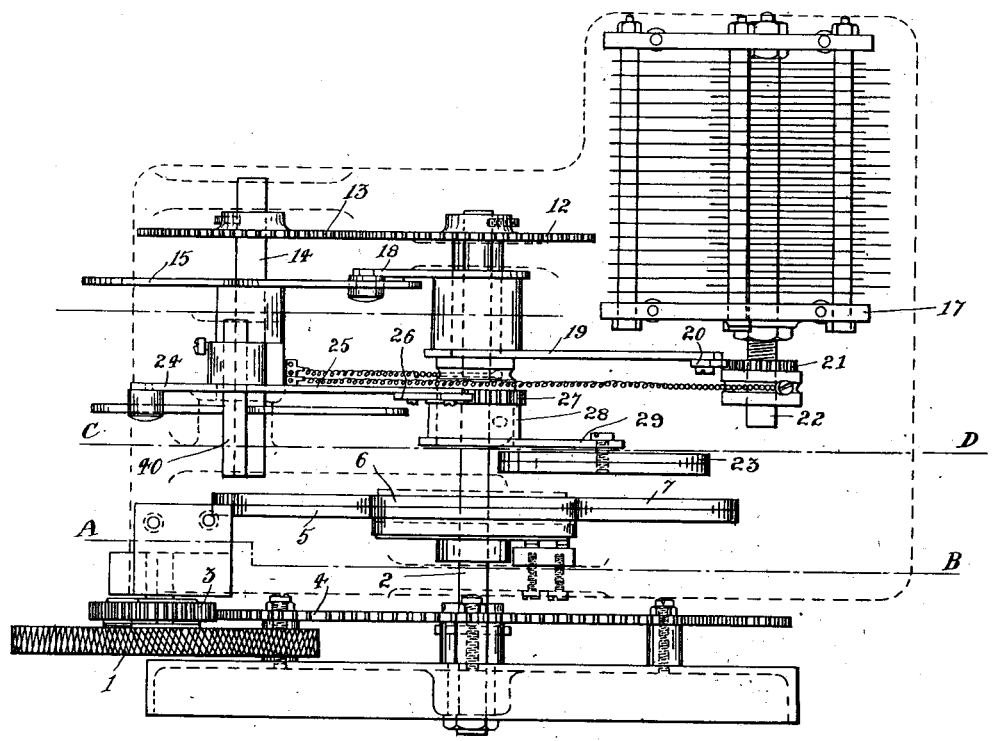
Fig. 1 is a plan view of the control apparatus described in the main application.
Figure 2:
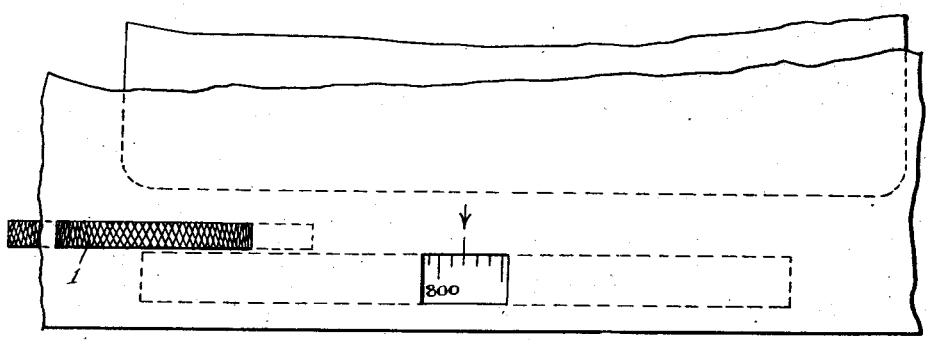
Fig. 2 is a plan view of a part of Fig. 1.
Figure 3:
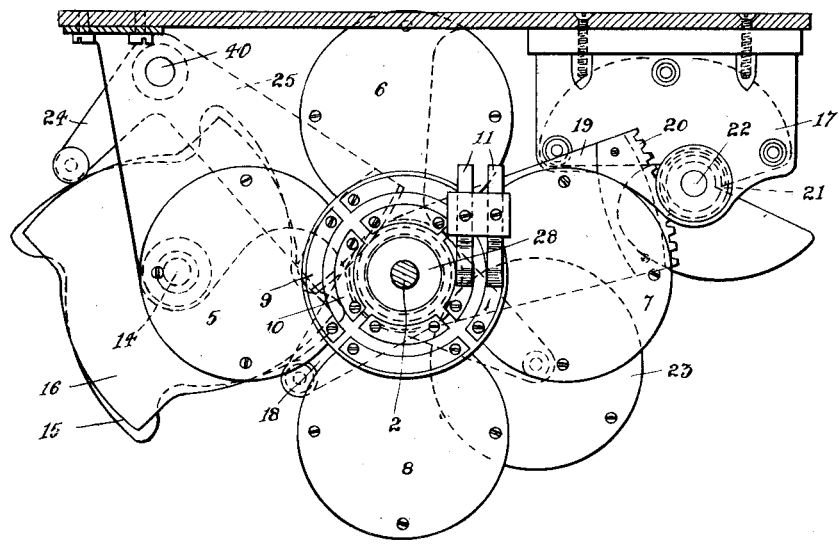
Fig. 3 is sectional elevation on the line A—B of Fig. 1.

Referring to Figs. 1, 2 and 3 of the drawings, 1 is a finger operated wheel adapted to rotate the shaft 2 through gears 3 and 4. Upon shaft 2 are keyed or otherwise rigidly secured four aerial inductance coils 5, 6, 7 and 8 arranged in the manner clearly shown in Figs. 1 and 3 and each corresponding to a certain band of wave lengths. The ends of these coils are connected with pairs of segments 9, 10 and each coil is put in circuit in turn by stationary brushes 11 which rub on the segments 9, 10 which rotate with the coils. At the rear end of shaft 2 is a gear wheel 12 which meshes with and drives a similar gear wheel 13 rigidly mounted on shaft 14. 15 and 16 are cams mounted upon shaft 14 and rotating therewith.

Figure 4:
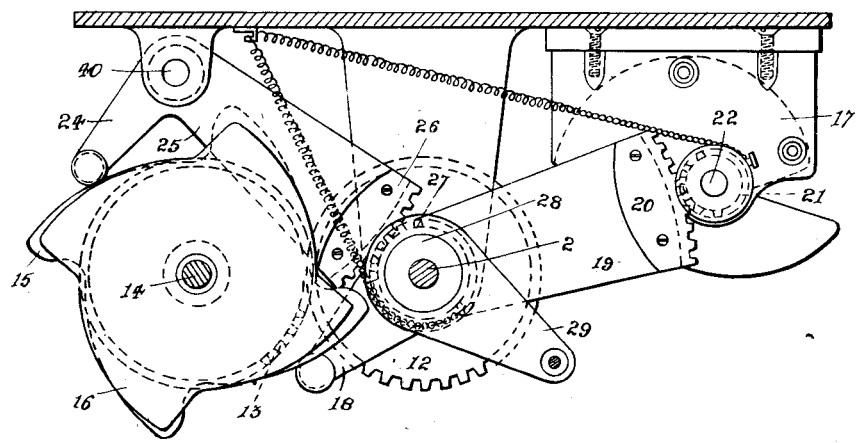
Fig. 4 is a sectional elevation on the line C—D of Fig. 1.

The cam 15 operates the condenser 17 by rocking a bell crank lever 18—19 about shaft 2, a toothed segment 20 on the end of the arm 19 of the bell crank lever engaging with a gear wheel 21 on the condenser shaft 22. Cam 16 controls the movement of the reaction coil 23 through a bell crank lever 24—25 rocked about an axis 40, and a toothed segment 26 carried on the end of arm 25 of the bell crank lever which engages with teeth 27 on the boss 28 mounted on shaft 2 and carrying arm 29 with the reaction coil 23 secured thereto. From Figs. 3 and 4 it will be observed that the periphery of each cam 15 and 16 is divided into four parts and each part serves to move the component which it controls through a certain range of movement and the arrangement is such that both the condenser 17 and the reaction coil 23 can be moved over that range while one of the aerial inductance coils 5, 6, 7 or 8 is in circuit.

Figure 5:
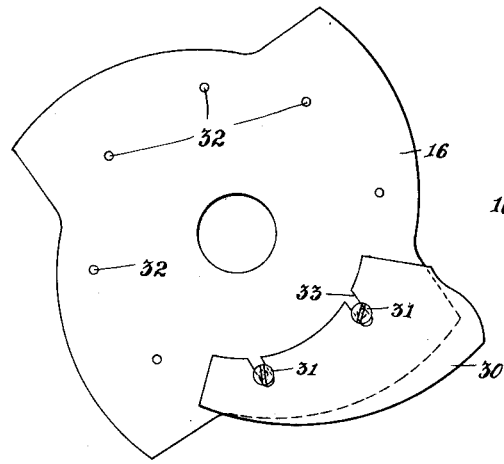
Fig. 5 illustrates a cam such as used with the control apparatus described above, provided with a raised or steepened portion in accordance with this invention.
Figure 6:
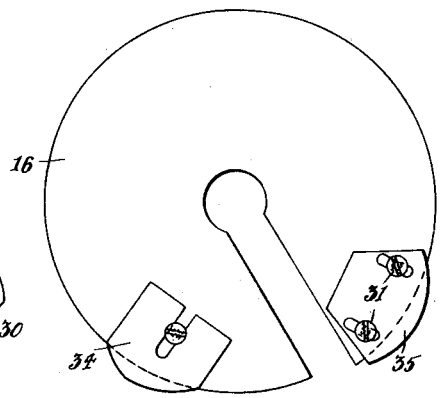
Figs. 6 and 7 illustrate alternative forms.

If now it is for example desired to vary the extent or rate of movement of the reaction coil 23 to vary its coupling with the aerial inductance coil, one or more raised or steepened portions are formed upon the periphery of the cam 16. These may be formed by plates 30, secured to the cam by screws or bolts 31 passed through holes 32 in the cam 16 (see Fig. 5). The plates may be provided with long slots 33 to permit the adjustment of the plates radially of the cam, and a number of holes 32 may be provided spaced around the cam so that the plates 30 may be attached in any position around the centre of the cam. Where a number of plates are required some may be mounted upon the front of the cam and some on the back (see Fig. 7). Fig. 6 illustrates a cam which during a complete revolution provides for only one range of movement of the component which it controls. The plates 30 may be of any desired shape, the two shown at 34 and 35 in Fig. 6 being given only by way of example, the edge, however, which is to form part of the periphery of the cam being of such shape as to give the necessary lift.

Figure 7:
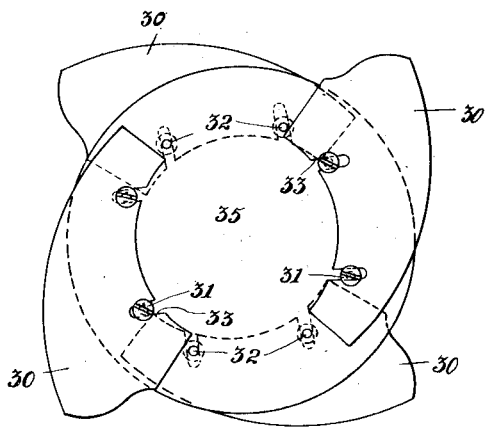

If convenient the original cam may be replaced by a circular plate such as 35 in Fig. 7 with spaced holes 32 in it to which the plates 30 can be readily attached.

I claim:

1. In an electrical apparatus for radio reception, a tuning device comprising a variable coupling, a single control member, means including a cam member operatively connecting said control member with said variable coupling and adapted to move both members of said coupling at different rates, and means for varying the cam surface.

2. In a radio apparatus, a variable tuning coupling, a single control member, means including a cam operatively connecting said control member with said variable coupling and adapted to move both members of said coupling at different rates, and means adapted to form a steepened portion on the periphery of said cam.

3. In a radio apparatus, a variable tuning coupling, a single control member, means including a cam operatively connecting said control member with said variable coupling, and adjustable means forming one or more raised portions on the cam surfaces to vary the rate of relative movement of the members of said coupling.

4. In a radio apparatus, tuning means comprising a variable coupling, a single control member, means including a cam operatively connecting said control member with said coupling for adjusting both members of the coupling in predetermined relationship, and means for varying the adjustment of said coupling including a plate secured to said cam and adjustable relatively thereto.

5. In a radio apparatus, tuning means comprising a variable coupling, a single control member, means operatively connecting said control member with said coupling and including a cam, said means being adapted to adjust both members of said coupling, and a shaped plate mounted on and variable radially of said cam to form a steepened portion on the cam periphery.

6. In a radio apparatus, tuning means comprising a variable coupling, a single control member, means operatively connecting said control member with said coupling and including a cam, said means being adapted to adjust both members of said coupling, and a shaped plate mounted on and variable radially of said cam and about the center thereof to form a steepened portion on the cam periphery.

7. In radio apparatus, tuning means comprising a plurality of movable inductance coils adapted to be successively inserted in circuit, a coil coupled with that inductance coil which is in circuit and movable relative thereto, a control member, means for moving said coupled coils at different rates including a cam member operatively connected with one of said coils, and means for varying the cam surface.

8. In radio apparatus, tuning means comprising a plurality of movable inductance coils adapted to be successively inserted in circuit, a coil coupled with that inductance coil which is in circuit and movable relative thereto, a single control member, means adapted to move both of said coupled coils relative to one another at different rates and including a cam operatively connected with one of said coils, and means adapted to form a steepened portion on the cam periphery to vary the adustment of the rate of relative movement of said coils.

In testimony whereof I have signed my name to this specification.

BRENCHLEY ERNEST GEORGE MITTELL.